E. F. W. ALEXANDERSON.
DYNAMO ELECTRIC MACHINE.
APPLICATION FILED JULY 27, 1910.

1,091,613.

Patented Mar. 31, 1914.

2 SHEETS—SHEET 1.

WITNESSES:
Helen Orford
Benjamin B. Hull

INVENTOR:
ERNST F. W. ALEXANDERSON.
BY Albert G. Davis
HIS ATTORNEY.

E. F. W. ALEXANDERSON.
DYNAMO ELECTRIC MACHINE.
APPLICATION FILED JULY 27, 1910.

1,091,613.

Patented Mar. 31, 1914.
2 SHEETS—SHEET 2.

(Coils on Poles A'+A²)

WITNESSES
J. Ellis Glen.
J. Earl Ryan

INVENTOR
ERNST F. W. ALEXANDERSON
BY Albert G. Davis
HIS ATTORNEY

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

DYNAMO-ELECTRIC MACHINE.

1,091,613.      Specification of Letters Patent.     Patented Mar. 31, 1914.

Application filed July 27, 1910. Serial No. 574,106.

*To all whom it may concern:*

Be it known that I, ERNST F. W. ALEXANDERSON, a citizen of the United States, residing at Schenectady, county of Schenectady, State of New York, have invented certain new and useful Improvements in Dynamo-Electric Machines, of which the following is a specification.

My invention relates to dynamo-electric machines and its object is to produce a machine which will maintain constant voltage, regardless of variations in speed or in the load on the external circuit.

Constant voltage generators for varying speeds have been proposed heretofore but those in which the regulation is inherent in the machine, that is, not determined by external regulators, have, so far as I am aware, depended upon the effect of the load current for obtaining the desired characteristic. In such a machine if the load is varied, as by turning on or off lamps on the load circuit, the voltage of the machine varies. By my invention the constancy of voltage is made independent of both speed variations and variations in load. I accomplish this result by providing a plurality of sets of armature brushes, certain of which are connected to the load circuit and others of which serve simply as exciting brushes; and in the field magnet, in inductive relation to the exciting brushes, I produce an effective flux which is the difference of two fluxes, one being substantially constant and the other substantially proportional to the voltage on the load circuit. With this arrangement, if the voltage on the external circuit tends to rise from any cause the opposing flux in inductive relation to the exciting brushes rises so as to reduce the voltage induced between them, thereby reducing the field in inductive relation to the brushes connected to the load circuit and, consequently, reducing the voltage of the load circuit.

The substantially constant flux which I have mentioned may be conveniently obtained by a winding in shunt to the load circuit mounted on a portion of the field magnet which is of restricted cross section, so that it is highly saturated.

My invention will best be understood by reference to the accompanying drawings, in which—

Figure 1:
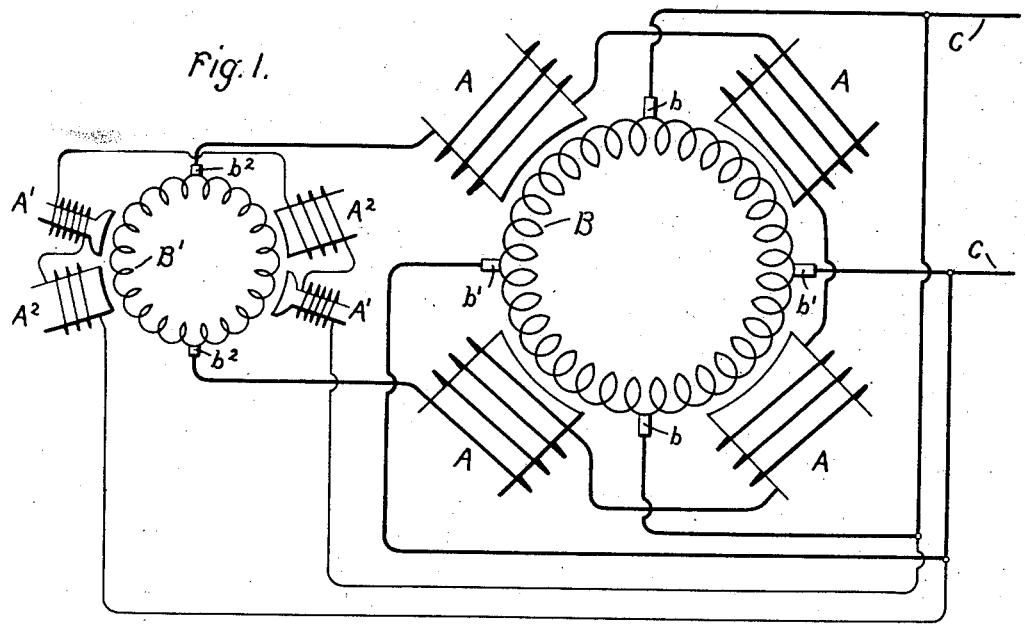
Figure 2:
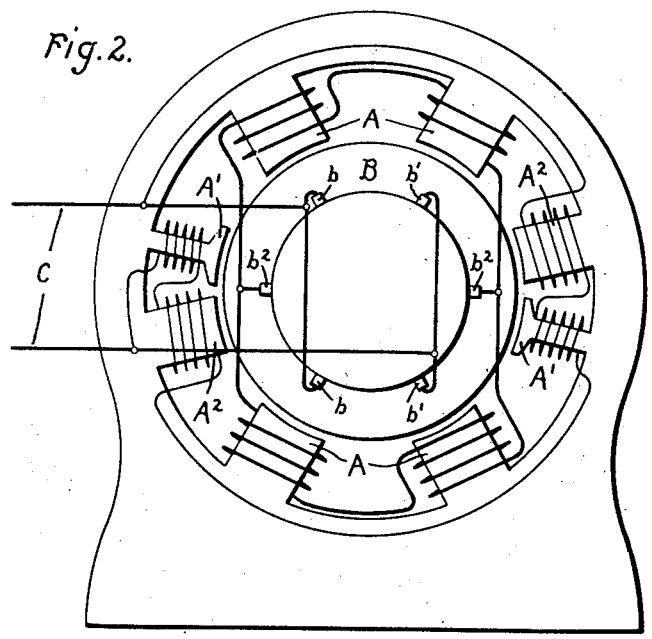
Figure 3:
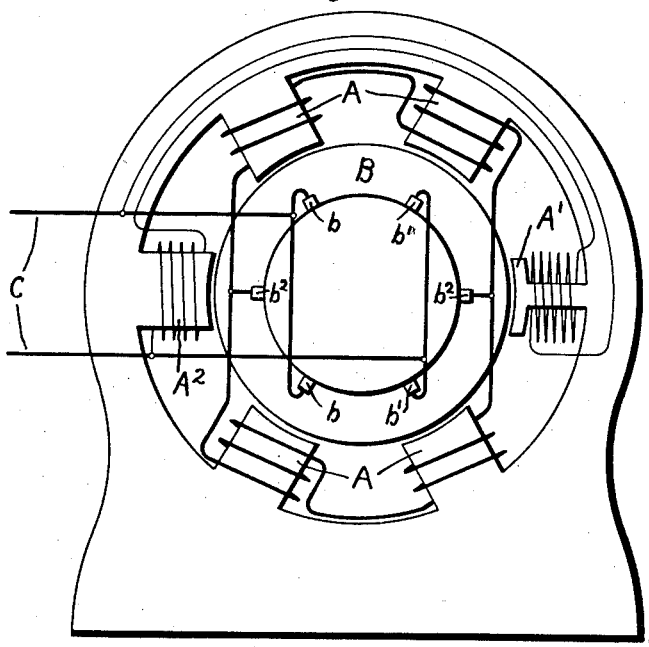
Figure 4:
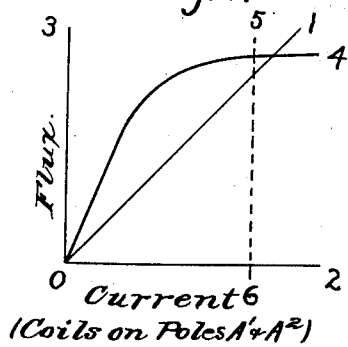

Figure 1 shows diagrammatically a machine arranged in accordance with my invention, the exciter portion being shown as a separate structure; Fig. 2 shows an arrangement similar to Fig. 1, except that the exciter portion is combined with the rest of the machine in a single structure; Fig. 3 shows a modification of the arrangement of Fig. 2, and Fig. 4 is an explanatory diagram.

Referring to Fig. 1, A A represent the field poles of a dynamo-electric machine. B represents the armature winding which is shown diagrammatically as of the Gramme ring type provided with commutator brushes $b\ b$ and $b'\ b'$. The brushes $b\ b$ are of one polarity and the other brushes $b'\ b'$ of the opposite polarity. These brushes are connected to a load circuit C, the voltage of which it is desired to maintain constant. B' represents an auxiliary armature winding with commutator brushes $b^2$, from which is led the current for exciting the main poles A A. In inductive relation to the winding B' are two sets of poles A' A' and $A^2\ A^2$. The poles A' A' are of opposite polarity and are excited in any suitable manner. In the drawing coils are shown on these poles which are connected together with the coils of the poles $A^2\ A^2$ in shunt to the circuit C. The poles A' A' are of restricted cross section so as to be highly saturated. The poles $A^2\ A^2$ have their coils so connected that each is of the opposite polarity to that of the adjacent pole A'. The two poles A' and $A^2$ on each side of the winding B' thus produce a magnetic field by the resultant action of two opposing magneto-motive forces, the character of the magnetic circuit being such that one magneto-motive force tends to produce a constant flux and the other tends to produce a flux which varies with the voltage of the circuit C. The constant flux of the poles A' A' is the stronger, this being indicated by a greater number of turns on these poles. The net result is that an electromotive force is induced between the brushes $b^2\ b^2$ which is proportional to the difference of the fluxes, or expressed in another way, the two fluxes produced in the poles A' and $A^2$ induce opposing electromotive forces in the armature coils connected to the brushes $b^2$, $b^2$, and this electromotive force is impressed on the field winding on the poles A A. This is shown diagrammatically in Fig. 4 in which the abscissas on the axis 0—2 represent the electromotive force of the circuit C or the current in the field coils on the poles A' and A², this current being proportional to the load circuit voltage. Ordinates on the axis 0—3 represent the flux passing through the poles. The curve 0—4 is the curve of magnetization of the saturated poles A', while the straight line 0—1 is the curve of magnetization of the unsaturated poles A². The point where the machine operates is indicated in dotted lines at 5—6. At this point the magnetization of the saturated poles A' is practically constant. The voltage induced between the exciting brushes $b^2$ $b^2$ is proportional to the difference at this point between the ordinates of the curve 0—4 and the straight line 0—1, that is, proportional to the small portion of the dotted line 5, 6 which is included between these lines. Now if the voltage of the load circuit rises a very small amount, for any cause, a corresponding increase in the currents in the field poles A' and A² is produced. The effect is to shift the dotted line 5, 6 in Fig. 4 a small amount toward the right. Even a very small shift of this line greatly decreases the length of the portion of this line included between the curve 0—4 and the line 0—1, so that the voltage between the exciting brushes is very materially reduced and the tendency to increase the voltage in the load circuit is offset by a reduction of the strength of poles A A. Similarly, a very slight decrease of voltage on the load circuit produces a very great increase in the exciting voltage. Thus very close regulation is obtained and this regulation is wholly independent of speed and of load variations.

While the exciting portion of the machine may be placed on an independent structure, as shown in Fig. 1, it may also be combined with the rest of the machine, as shown in Fig. 2. In this figure the poles A A are arranged like four poles of a six pole machine, the poles opposite the brushes b b being of one polarity and those opposite the brushes b' b' being of the other polarity. In this figure the armature is indicated as of the drum type, so that the physical position of the brushes is opposite the centers of the field poles. The brushes $b^2$ $b^2$ are not connected to the load circuit C but serve as in Fig. 1 simply as exciting brushes. The poles A' and A² are arranged in inductive relation to the armature coils connected to the brushes $b^2$ $b^2$ and their windings are connected precisely as in Fig. 1. Since in a multipolar armature each pole acts only on the coils beneath it, or in other words, on the coils connected to the brushes opposite that pole, part of the coils of the single armature winding B in Fig. 2 act at any instant to generate the exciting voltage between the brushes $b^2$ $b^2$, while the rest of the armature coils serve to generate the current which is supplied to the load circuit C.

In a multipolar machine it is not essential that a pole A' and a pole A² should be placed at each exciting brush. Instead one of the poles A' may be placed at one of the exciting brushes $b^2$ and the other at the other brush. This arrangement is shown in Fig. 3. It has the advantage, as compared with Fig. 2, of reducing the number of poles and field coils, but it has the disadvantage that commutation is somewhat less satisfactory. If with the arrangement of Fig. 2 the armature is driven in a counter-clockwise direction commutation on the exciting brushes $b^2$ $b^2$ will take place under the tips of the saturated poles A' and, therefore, in a field of constant strength. This is not the case in Fig. 3 with respect to commutation beneath the pole A².

I do not desire to limit myself to the particular construction and arrangement of parts shown and described but aim in the appended claims to cover all modifications which are within the scope of my invention.

What I claim as new and desire to secure by Letters Patent of the United States, is,—

1. In combination, armature coils, a field magnet, commutator brushes for collecting the currents induced in said coils, certain of said brushes being adapted to be connected to an external circuit and others of said brushes serving as exciting brushes, means for producing in said field magnet in inductive relation to the armature coils connected to the exciting brushes an effective flux which is the difference of two fluxes, one being substantially constant and the other substantially proportional to the voltage between the brushes adapted to be connected to the external circuit, and means for producing in said field magnet in inductive relation to the armature coils connected to the latter brushes a magnetic field substantially proportional to the voltage between the exciting brushes.

2. In combination, armature coils, a field magnet, commutator brushes for collecting the currents induced in said coils, certain of said brushes being adapted to be connected to an external circuit and others of said brushes serving as exciting brushes, means for producing in said field magnet two fluxes inducing opposing electromotive forces in the armature coils connected to the exciting brushes, one of said fluxes being substantially constant and the other substantially proportional to the voltage between the brushes adapted to be connected to the external circuit, and means for producing in said field magnet in inductive relation to the armature coils connected to the latter brushes a magnetic field substantially proportional to the voltage between the exciting brushes.

3. In combination, armature coils, commutator brushes for collecting the currents induced in said coils, certain of said brushes being adapted to be connected to an external circuit, and others of said brushes serving as exciting brushes, means for producing a magnetic field in inductive relation to the armature coils connected to the exciting brushes by the resultant action of two opposing magneto-motive forces, the character of the magnetic circuit being such that one magneto-motive force tends to produce a substantially constant flux and the other tends to produce a flux substantially proportional to the voltage between the brushes adapted to be connected to the external circuit, and means for producing in inductive relation to the armature coils connected to the latter brushes a magnetic field substantially proportional to the voltage between the exciting brushes.

4. In combination, armature coils, a field magnet for inducing currents in said coils, commutator brushes for collecting the currents induced in said coils, certain of said brushes being adapted to be connected to an external circuit and serving as load brushes and others of said brushes serving as exciting brushes, opposing and unequal field windings on different portions of the field magnet in inductive relation to the armature coils connected to the exciting brushes, the portion of the field magnet on which the stronger winding is wound being of restricted cross section so as to be highly saturated and the portion of the field magnet on which the other winding is wound being unsaturated, said other winding being connected to the load brushes, and a winding on the field magnet in inductive relation to the armature coils which are connected to the load brushes, said last mentioned winding being connected to the exciting brushes.

5. In a constant voltage dynamo-electric machine, a field magnet, an armature having a commutator and a plurality of sets of brushes, certain of said brushes being adapted to be connected to an external circuit, and others of said brushes serving as exciting brushes, means for producing in the field magnet a substantially constant flux in inductive relation to the armature coils connected to the exciting brushes, means for producing a second flux in opposition to the first in its inductive effect on the armature and proportional to the voltage between the first mentioned brushes, and means for producing in the field magnet in inductive relation to the armature coils connected to the first mentioned brushes a flux substantially proportional to the voltage between the exciting brushes.

6. In a constant voltage dynamo-electric machine, a field magnet, an armature provided with a commutator and a plurality of sets of brushes, certain of said brushes being adapted to be connected to an external circuit, and others of said brushes serving as exciting brushes, two field coils producing opposing and unequal magneto-motive forces in inductive relation to the armature coils connected to the exciting brushes, the portion of the field magnet on which the stronger of said opposing coils is wound being of restricted cross section so as to be highly saturated, and the portion of the field magnet on which the other of said opposing coils is wound being unsaturated, said opposing coils being connected to the first mentioned brushes, and a field winding connected to the exciting brushes and in inductive relation to the armature conductors connected to the first mentioned brushes.

7. In a constant voltage dynamo electric machine, a multipolar field magnet, an armature provided with a plurality of sets of brushes corresponding to the field poles, certain of said brushes being adapted to be connected to an external circuit and others of said brushes serving as exciting brushes, field coils for the poles corresponding to the first mentioned brushes connected to said exciting brushes, and means for producing in the field poles corresponding to the exciting brushes a magnetic field by the resultant action of two opposing magneto-motive forces, the character of the field poles being such that one magneto-motive force tends to produce a substantially constant flux, and the other magneto-motive force a flux substantially proportional to the voltage between the first mentioned brushes.

8. In a constant voltage dynamo electric machine, a multipolar field magnet, an armature provided with a plurality of sets of brushes corresponding to the field poles, certain of said brushes being adapted to be connected to an external circuit and others of said brushes serving as exciting brushes, means for producing in the field poles corresponding to said first mentioned brushes a flux substantially proportional to the voltage between said exciting brushes, and means for producing in the field poles corresponding to the exciting brushes a magnectic field by the resultant action of two opposing magneto-motive forces, the character of the field poles being such that one magneto-motive force tends to produce a substantially constant flux, and the other producing a flux substantially proportional to the voltage between the first mentioned brushes.

9. In a constant voltage dynamo electric machine, an armature having a commutator and a plurality of sets of brushes, certain of said sets of brushes being adapted to be connected to an external circuit and other sets of brushes serving as exciting brushes, a multi-polar field magnet having a pole for each of said first mentioned sets of brushes, and two poles for each of said second sets of brushes, field coils on the poles corresponding to the first mentioned brushes connected to the exciting brushes, field coils on the two poles respectively which correspond to the exciting brushes, said coils producing opposite and unequal magneto-motive forces, the pole on which the stronger of said two opposing coils is wound having a portion of restricted cross section so as to be highly saturated, said opposing coils being connected in shunt to the first mentioned brushes.

In witness whereof, I have hereunto set my hand this 26th day of July, 1910.

ERNST F. W. ALEXANDERSON.

Witnesses:
BENJAMIN B. HULL,
HELEN ORFORD.